Dec. 22, 1970  T. J. COHEN  3,548,500

METHOD OF TAKING DENTAL IMPRESSIONS

Filed May 8, 1969

Inventor
Theodore J. Cohen
by Roberts Cushman & Grover
Attys

United States Patent Office 3,548,500
Patented Dec. 22, 1970

3,548,500
METHOD OF TAKING DENTAL IMPRESSIONS
Theodore J. Cohen, 43 Voorhis Drive,
Old Bethpage, N.Y. 11804
Filed May 8, 1969, Ser. No. 822,936
Int. Cl. A61c 9/00
U.S. Cl. 32—17                                                        4 Claims

ABSTRACT OF THE DISCLOSURE

Impressions of a tooth, used ultimately to prepare a cap, bridgework, replacement, or the like, are taken by a process which first provides an expandible band of thin flexible sheet material, e.g. of copper, in the form of a cylinder with overlapping layers free to slide against each other to permit the cylinder opening to enlarge. The expandable band is placed over the tooth whose impression is to be taken, and the cylinder layers slide to accommodate the tooth and to provide a close fit. The sheet at one end of the cylinder is typically trimmed by the dentist to parallel the joint between tooth and gum, which the band is to fit closely for a full impression. After the band has been fitted to the circumferential size of the tooth, the overlapping layers of the band are secured to one another, and soft impression material is introduced into the space between tooth and band. After the impression material is firm, the band and impression material are removed from the tooth, whose impression can then be used for the typical dental purposes aforementioned.

BACKGROUND OF THE INVENTION

(1) Field of the invention

This invention relates to the field of dentistry, and more particularly to methods for providing impressions of individual teeth to facilitate preparation of caps, bridgework, replacements and the like.

(2) Description of the prior art

In preparing teeth for capping, bridgework or replacement, it is customary to first make an impression of each tooth so that a model of the tooth can be obtained for use in the laboratory. To make the impression, the dentist takes a copper tube, and forces it over the tooth to a depth below the gum line, i.e., into the gingival sulcus, the groove between gum and tooth at the gum line. The lower edge of the tube may be trimmed for better fit. The tube is removed and filled with soft impression material or molding compound, and once again forced over the tooth to bring the impression material into contact with the tooth. After the material hardens, the copper tube and material are removed from the tooth and can be used as a mold to prepare a copy of the tooth.

Because teeth are of different sizes, the fitting of the copper tube requires the dentist to select a tube from a kit containing approximately twenty tubes, all of different diameter. It is a trial and error process to find the right diameter tube, and because teeth are of irregular shape, several tries are generally necessary. The patient suffers discomfort during this process, and ill-fitting tubes may also cause damage to sensitive gum tissues, at times causing the gum to become separated from the tooth where it was formerly attached. These drawbacks make the process of taking dental impressions slow, cumbersome, painful and expensive.

Some efforts have been made to construct a universally fitting tube, such as shown by United States patent to Craigo, No. 1,886,872 and by United States patent to Sternberg, No. 1,257,947. The former patent discloses an impression cup with longitudinal scoring at one end which would permit it to be peeled back like a banana to fit a tooth. The difficulty of using such a device makes it impractical, however. The latter patent discloses an impression cup with overlapping walls which can be adjusted in diameter by means of a catch fitting a tongue into one of many circumferential slots, thus in effect constituting the full set of twenty fixed-diameter tubes in one, the most likely diameter being selected by the dentist and fixed by means of the catch. In this example, however, the trial and error aspect of fitting continues to be a problem, and a poor fit and discomfort attend its use.

SUMMARY OF THE INVENTION

Objects of the present invention are to provide a process for taking dental impressions which eliminates the need to select by trial and error from a large number of standard diameter impression members, which permits the impression member to be easily fitted to the tooth, which eliminates the irritation and inconvenience to the patient caused by improper fit, and which is easy and inexpensive to make and use.

According to the invention, the process for taking dental impressions comprises: providing an expandable band of thin, flexible sheet material (e.g., copper sheet) shaped spirally to form a cylinder with overlapping layers free to slide against each other to permit the cylinder opening to enlarge; placing said expandable band over the tooth whose impression is to be taken, said cylinder layers sliding to accommodate the circumference of said tooth in the cylinder opening; securing said overlapping layers to one another to fix the size of said opening; supplying soft impression material to the space between the tooth and expandable band; and removing the band and impression material from the tooth after the material becomes firm. After it is placed over the tooth, the expandable band may be peripherally trimmed to provide an accurate fit to the gum line.

These and other objects and novel features of the invention will become apparent from the following description of a preferred embodiment.

DESCRIPTION OF THE PREFERRED EMBODIMENT

Figure 1:
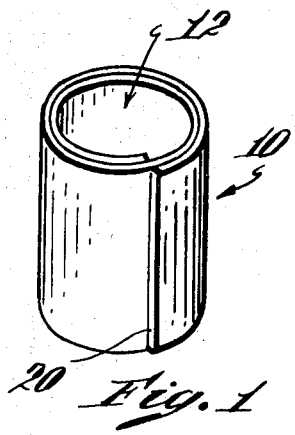
FIG. 1 is a perspective view of the expandable band employed in the present invention.
Figure 2:
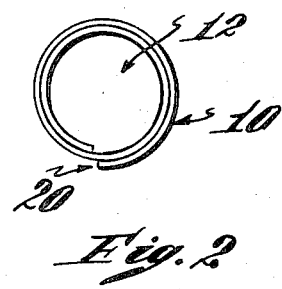
FIG. 2 is an end view of the band of FIG. 1, showing the overlapping spiral construction of the expandable band layers.

FIGS. 1 and 2 illustrate the expandable band 10 used in the process of the present invention as a substitute for the fixed-diameter impression cups of prior processes. The expandable band 10 is formed from a thin flexible rectangular sheet of imperforate material, for example, copper sheet of a thickness and ductility comparable to that used for walls of earlier impression cups. As FIG. 2 shows, the sheet is shaped spirally to form a cylinder with a central opening 12. The sheet overlaps itself, and the overlapping layers of the sheet forming the cylinder are free to slide against each other to permit the central opening 12 to expand in diameter. In the illustrated example, the sheet overlaps itself for the full circumference of the expandable band 10, which permits considerable expansion while still maintaining the cylinder circumference closed. A lesser amount of overlap, for example, for as little as one-tenth of the circumference, or even less, may be suitable in many instances.

Figure 3:
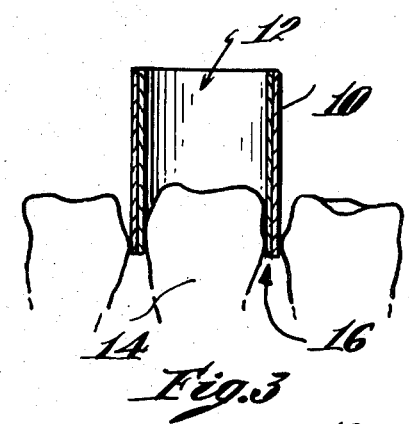
FIG. 3 is a side sectional view illustrating the placing of the expandable band over the tooth.

The expandable band 10, shown in its manufactured form in FIGS. 1 and 2, is used in the present process for making dental impressions as follows: As illustrated in FIG. 3, the expandable band 10 is placed over the tooth 14 whose impression is to be taken, so that the tooth 14 is received in opening 12. As the band 10 is placed over the tooth, the overlapping layers from which it is constructed slide against one another to accommodate the circumference of the tooth in the cylinder opening. Since the expandable band 10 can adjust to the tooth as it is fitted, a very close and accurate fit can be quickly obtained, without danger from gouging of gums and the like, and without the trial and error aspect of former processes.

As the expandable band 10 is lowered over the tooth, it may be desired to cut or trim its lower edge 16 to parallel the gum for a close fit at the base of the tooth, as is currently required for a proper fit in some cases in conventional impression methods. Since the band 10 is expandable, it may be expanded during trimming to permit a tool to be used on the inside surface of the band, e.g., to eliminate burrs or sharp edges which might lacerate the gum tissue. The band can be contracted thereafter to a size giving a close fit.

Figure 4:
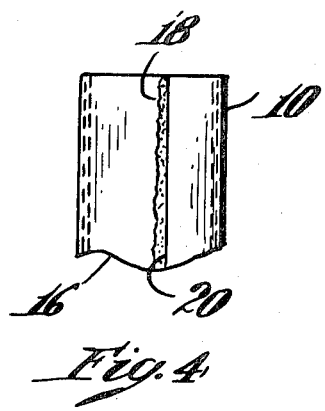
FIG. 4 is a side view of the expandable band shown trimmed and joined after fitting.

After the band 10 has been adjusted in diameter to the proper size, and has had its lower edge 16 trimmed if appropriate, the overlapping layers of the band are secured to one another to fix the size of the opening 12. As illustrated in FIG. 4, the overlapping layers can be secured by applying soft solder 18 along the longitudinal overlapping edge 20 of the sheet material. This can easily be done in a conventional manner after removal of the band 10 from the patient's mouth. Other securing methods can be employed: for example, the overlapping layers can be crimped together with a tool; or cold welded by the application of pressure (applicable very well to the soft metals, such as aluminum, which are useful for making the band 10); or adhered by means of an adhesive, especially where the band 10 is made from a plastic or plastic-coated material. Depending on the room available in which to insert a tool, some or all of the latter processes can be performed while the band 10 is in the patient's mouth.

Figure 5:
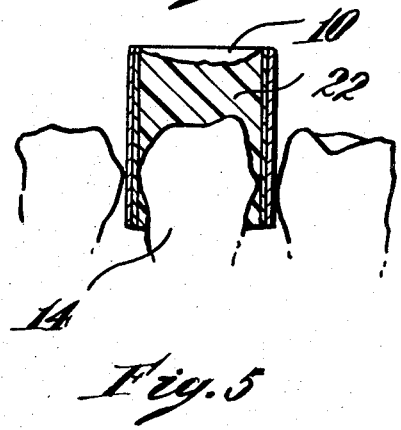
FIG. 5 is a side sectional view similar to FIG. 3 with impression material introduced around the tooth.
Figure 6:
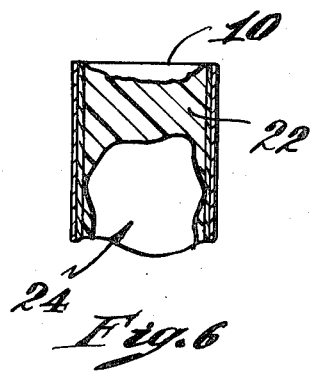
FIG. 6 is a side sectional view of the completed impression.

After the overlapping layers of the band are secured, molding compound or impression material 22 is introduced in a softened state into the space between the band 10 and tooth 14 until it follows the contours of the tooth (FIG. 5). When the impression material 22 firms or hardens, the band 10 and material 22 are together removed from the tooth, whose impression 24 then remains in the material 22 for use in making a model of the tooth (FIG. 6).

It should be apparent that by using the process of the present invention to take dental impressions, it is possible to quickly and conveniently fit an impression member (the expandable band) to a tooth without trial and error and with minimum pain to the patient. Since the expandable band 10 can be made in a uniform size to accommodate several sizes of teeth, manufacturing costs are also lowered by its use.

It should be understood that the present disclosure is for the purpose of illustration, and that the invention includes all modifications falling within the scope of the appended claims.

I claim:
1. A process for taking dental impressions comprising:
   (1) providing a continuously expandable band of smooth thin flexible sheet material shaped spirally to form a cylinder with overlapping layers free to slide against each other to permit the cylinder opening to enlarge;
   (2) placing said cylindrically shaped expandable band over the tooth whose impression is to be taken, said cylinder layers silding during such placing to accommodate the circumference of said tooth in the cylinder opening;
   (3) maintaining said cylinder layers in the relationship accommodating the tooth, and, while maintaining the cylinder relationship, securing said overlapping layers to one another to fix the size of said opening;
   (4) supplying soft impression material to the space between the tooth and expandable band; and
   (5) removing the band and impression material from the tooth after the impression material becomes firm.
2. A process according to claim 1, further comprising, before securing said overlapping layers, expanding said band, trimming the periphery of said expandable band, and again contracting said band to the relationship accommodating the tooth.
3. A process according to claim 1 wherein said overlapping layers are secured by applying a material to adhere them together.
4. A process according to claim 1 wherein said overlapping layers are secured by adhering them together.

References Cited

UNITED STATES PATENTS 1,257,947   2/1918   Sternberg _____ 32—17

ROBERT PESHOCK, Primary Examiner